US012578059B1

(12) United States Patent
Barclay et al.

(10) Patent No.: US 12,578,059 B1
(45) Date of Patent: Mar. 17, 2026

(54) ENHANCED GAS STORAGE AND SENDOUT RESILIENCY WITH CO-LOCATED LNG AND UNDERGROUND GAS STORAGE FACILITIES

(71) Applicant: The Lisbon Group, LLC, Mercer Island, WA (US)

(72) Inventors: Michael A. Barclay, Issaquah, WA (US); M. Josue Zapata, Mercer Island, WA (US); John A. Barclay, Bothell, WA (US)

(73) Assignee: The Lisbon Group, LLC, Mercer Island, WA (US)

( * ) Notice: Subject to any disclaimer, the term of this patent is extended or adjusted under 35 U.S.C. 154(b) by 0 days.

(21) Appl. No.: 18/977,828

(22) Filed: Dec. 11, 2024

(51) Int. Cl.

| | |
|---|---|
| ***F17C 7/04*** | (2006.01) |
| ***F17C 1/00*** | (2006.01) |
| ***F25J 1/00*** | (2006.01) |
| ***F25J 1/02*** | (2006.01) |

(52) U.S. Cl.
CPC ................ *F17C 7/04* (2013.01); *F17C 1/007* (2013.01); *F25J 1/0022* (2013.01); *F25J 1/0251* (2013.01); *F17C 2205/0352* (2013.01); *F17C 2221/033* (2013.01); *F17C 2223/0153* (2013.01); *F17C 2223/035* (2013.01); *F17C 2227/0157* (2013.01); *F17C 2270/0142* (2013.01); *F25J 2290/62* (2013.01)

(58) Field of Classification Search
CPC ...... F25J 1/0022; F25J 1/0251; F25J 2290/60; F17C 2223/0153; F17C 2223/035; F17C 7/04; F17C 1/007
See application file for complete search history.

(56) References Cited

U.S. PATENT DOCUMENTS

| | | | | |
|---|---|---|---|---|
| 5,537,827 | A | 7/1996 | Low et al. | |
| 5,551,256 | A | 9/1996 | Schmidt | |
| 5,582,012 | A | 12/1996 | Tunkel et al. | |
| 5,600,969 | A | 2/1997 | Low | |
| 5,615,561 | A | 4/1997 | Houshmand et al. | |
| 5,642,630 | A * | 7/1997 | Abdelmalek ............ | F25J 3/067 62/929 |
| 6,085,546 | A | 7/2000 | Johnston | |
| 6,367,286 | B1 | 4/2002 | Price | |
| 6,378,330 | B1 | 4/2002 | Minta et al. | |
| 6,581,409 | B2 | 6/2003 | Wilding et al. | |
| 7,219,512 | B1 | 5/2007 | Wilding et al. | |
| 8,020,406 | B2 | 9/2011 | Vandor et al. | |

(Continued)

FOREIGN PATENT DOCUMENTS

| | | | |
|---|---|---|---|
| WO | 0025060 | A1 | 5/2000 |
| WO | 03072991 | A1 | 9/2003 |

*Primary Examiner* — Frantz F Jules
*Assistant Examiner* — Webeshet Mengesha
(74) *Attorney, Agent, or Firm* — Umberg Zipser LLP; Martin Fessenmaier

(57) ABSTRACT

Systems, plants, and methods are presented that make use of natural gas compression capability and various other components of an existing underground natural gas storage (UGS) facility by co-locating a liquefied natural gas (LNG) production and storage facility to increase natural gas storage of the UGS as LNG. Especially contemplated facilities include natural gas storage facilities with gas one or more compressor systems that have excess or redundant compression capacity.

14 Claims, 6 Drawing Sheets

(56) References Cited

U.S. PATENT DOCUMENTS

| | | | | |
|---|---|---|---|---|
| 8,899,074 | B2 | 12/2014 | Wilding et al. | |
| 9,657,901 | B2 | 5/2017 | Barker | |
| 2006/0213223 | A1* | 9/2006 | Wilding | F25J 1/0045 62/613 |
| 2010/0186446 | A1* | 7/2010 | Turner | F25J 1/0245 62/611 |
| 2016/0356545 | A1* | 12/2016 | Chen | F25J 1/0242 |
| 2020/0025334 | A1* | 1/2020 | Barclay | F25J 1/0087 |
| 2020/0392815 | A1* | 12/2020 | Clark | F01K 25/08 |

* cited by examiner

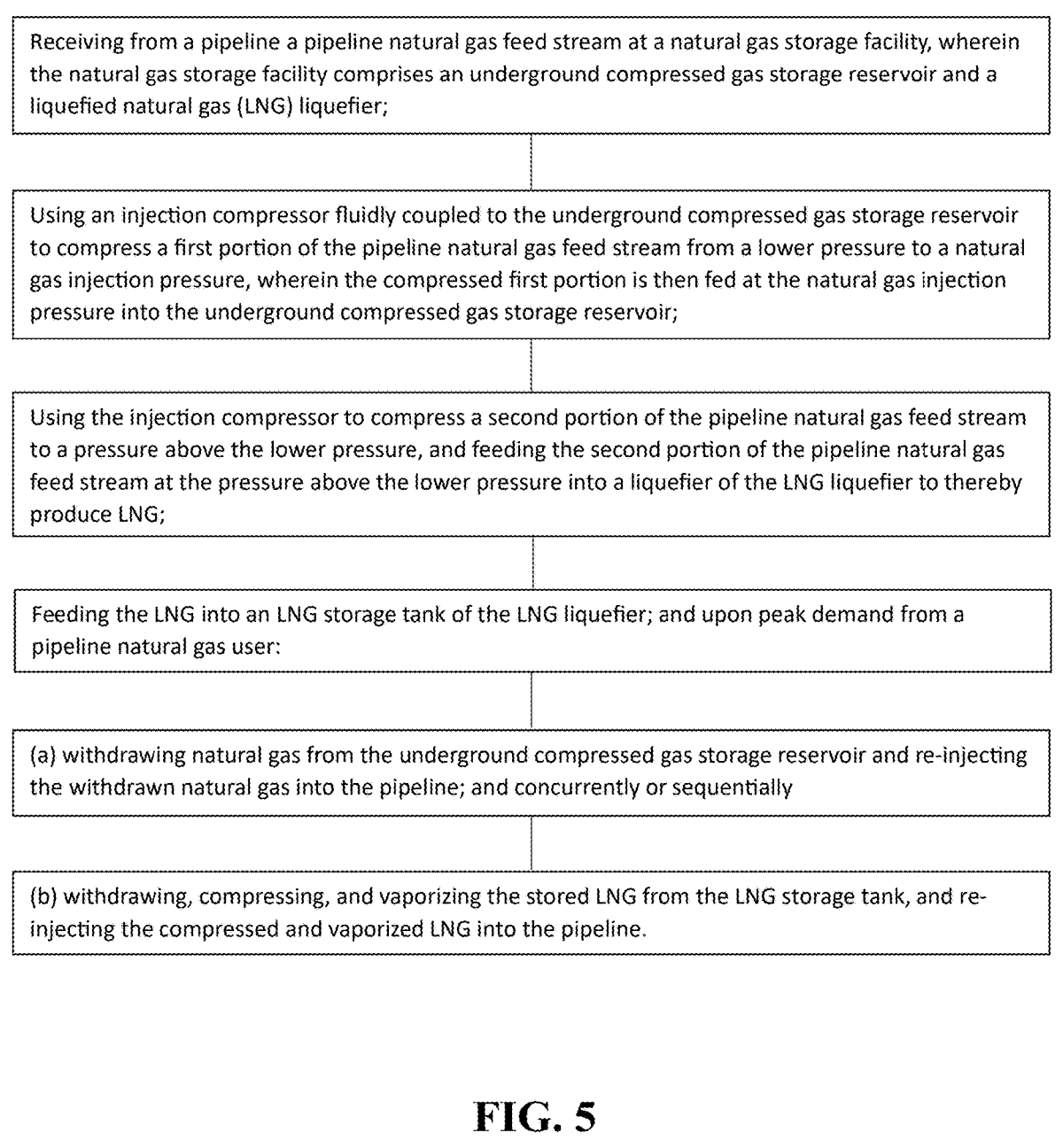

Receiving from a pipeline a pipeline natural gas feed stream at a natural gas storage facility, wherein the natural gas storage facility comprises an underground compressed gas storage reservoir and a liquefied natural gas (LNG) liquefier;

Using an injection compressor fluidly coupled to the underground compressed gas storage reservoir to compress a first portion of the pipeline natural gas feed stream from a lower pressure to a natural gas injection pressure, wherein the compressed first portion is then fed at the natural gas injection pressure into the underground compressed gas storage reservoir;

Using the injection compressor to compress a second portion of the pipeline natural gas feed stream to a pressure above the lower pressure, and feeding the second portion of the pipeline natural gas feed stream at the pressure above the lower pressure into a liquefier of the LNG liquefier to thereby produce LNG;

Feeding the LNG into an LNG storage tank of the LNG liquefier; and upon peak demand from a pipeline natural gas user:

(a) withdrawing natural gas from the underground compressed gas storage reservoir and re-injecting the withdrawn natural gas into the pipeline; and concurrently or sequentially (b) withdrawing, compressing, and vaporizing the stored LNG from the LNG storage tank, and re-injecting the compressed and vaporized LNG into the pipeline.

FIG. 5

ENHANCED GAS STORAGE AND SENDOUT RESILIENCY WITH CO-LOCATED LNG AND UNDERGROUND GAS STORAGE FACILITIES

FIELD OF THE INVENTION

The field of the invention is production and storage of liquefied natural gas, especially as it relates to liquefaction of natural gas in a facility that is collocated with an underground gas storage facility that is coupled to a gas pipeline network.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Natural gas presently supplies approximately 33% of the fuel for overall energy demand in the US, including the electricity generation, industrial, residential, and commercial sectors via US intrastate and interstate transmission pipeline infrastructure. Experience shows the demand from multiple types of pipeline natural gas fuel users across different energy sectors varies significantly daily, weekly, and seasonally. For example, natural gas peak demands often occur during extreme weather conditions in the winter (for heating) or summer (for cooling) months, depending upon geographic locations. Conversely, natural gas supply from the raw gas gathering and processing plants into the pipeline network is relatively continuous but may also be negatively impacted by extreme weather conditions. During peak natural gas demand periods, the purchase price of natural gas may be very high, especially during upset or extreme weather events. However, during such events, it remains very important that utilities continue to supply natural gas to customers who are relying on natural gas for heat and power. Indeed, supply outages during extreme weather result in property damage and expose the public to safety risks, so natural gas must be reliably supplied during such events. To strategically address these swings in the cost of gas, utilities often invest in some method to store natural gas, usually involving either densification of natural gas by compression into underground storage facilities or liquefaction of natural gas at LNG peak shaving plants or line packing.

Where underground gas storage (UGS) formations are unavailable or are geologically constrained in capacity, gas utilities have developed peak-shaving LNG storage facilities. To date, about 56 LNG stand-alone peak-shaving facilities, many built 40-50 years ago, operate in the US at select locations. A typical modern LNG peak shaver liquefier has production rates of about 100,000 gpd (gallons per day), allowing production of several million gallons of LNG in 2-3 months from the pipeline feedstock. Storing one billion cubic feet (Bcf) of natural gas at about 15 psia requires about 12.2 million gallons of LNG. Although this represents the most common modern LNG peak-shaver storage tank, smaller tanks, for example, bullet-shaped vessels, can be used. In most cases, the total equivalent gas volume storage among existing peak shavers varies from about 0.25 to about 6 Bcf. (Bcf means billion 'standard' cubic feet unless 'actual' is explicitly stated).

Compressing natural gas with a typical composition from atmospheric pressure of approximately 15 psia (0.1034 MPa) to approximately 1,500 psia increases its density by about 127 times. Alternatively, cooling NG from room temperature to the equilibrium boiling point of liquid natural gas (LNG) at 15 psia (−260° F. or −162° C.) increases its density by about 600 times (to 26.5 lbs/ft3 or 425 kg/m3). Both compressed and liquefied natural gas storage facilities have been developed and have been individually and separately connected to the pipeline network at optimum locations to provide local reserve natural gas storage capacity that can be quickly and locally re-injected into a pipeline to meet short-term peak demands that exceed the average daily pipeline supply rate. Such storage facilities are commonly referred to as 'gas storage' or 'peak shaver' plants. Growing reliance on natural gas as a fuel, changes in regional demand locations, and associated increased peak demands combined to create an increasing capacity and supply strain on the existing pipeline network and storage facilities.

In an effort to address this challenge, CA 2594529 describes a method to increase natural gas storage capacity in an underground cavern by cooling the gas to below ambient temperature by external auxiliary means before injecting the cooled gas into the structure. The natural gas density increases by the ratio of the gas's absolute temperatures before and after cooling, so more mass of natural gas can be stored in a fixed reservoir volume. However, cooling natural gas by 30-40° F. causes only a relatively small degree of densification, which only temporarily increases storage because the thermal mass of geological storage structures is much larger than that of the stored gas, and the cooled natural gas readily warms back up to almost the original structure temperature.

In another effort to increase UGS capacity, as described in U.S. Pat. No. 6,517,286 or U.S. Pat. No. 8,128,317, pipeline gas is cooled and liquefied into LNG before injection into an underground formation where the liquid is once more vaporized by thermal energy from the formation. While such a system allows for almost a doubling of storage capacity, several problematic issues arise. Among other things, such an LNG process may encounter injection-flow blockages due to methane-hydrate plugs, rapid increase in localized pressures which may exceed component specifications, micro-fracturing of the formation's internal surfaces that inhibit uniform distribution of the natural gas within the formation, and risk of over-pressurizing the formation as heat from the surrounding earth warms the cold gas or liquid. Consequently, such efforts were not adopted in existing natural gas infrastructure.

Outside the field of temporary natural gas storage for capacity enhancement, U.S. Pat. No. 9,657,901 describes a compressed natural gas fuel island system for CNG-adapted vehicles in which LNG that is supplied from an external source such as an LNG tanker is stored in a tank of slightly more than 10,000 gallons at a local CNG vehicle refueling station, and when needed daily to refuel vehicles, the LNG is pumped to CNG pressure and vaporized to supplement a compressed natural gas storage cylinder such that sufficient compressed natural gas is available for CNG adapted vehicles from a bulk CNG storage tank or a dispensing storage tank. In contrast, LNG peak shaver or UGS facilities have much larger storage capacity and delivery rates and are designed to reinject much larger rates of gas into the pipeline at local pressures that are about ½ those of full CNG tank pressures. Therefore, the system described in the '901 patent is entirely unsuitable for increasing natural gas storage capacity in networks to accommodate peak or other increased demand for natural gas in the pipeline network.

Thus, even though various systems and methods of natural gas storage are known in the art, all or almost all of them suffer from several drawbacks. Therefore, there remains a need for compositions and methods for enhanced natural gas storage facilities that can accommodate peak or other increased demand for natural gas in the pipeline network.

SUMMARY OF THE INVENTION

The inventive subject matter is directed to various systems and methods of enhanced natural gas storage facilities in which a UGS facility is co-located with an LNG production and storage plant, and in which the LNG production and UGS facility are integrated and share various components.

Advantageously, due to the excess and/or often redundant capabilities of UGS subsystems, and especially the excess and/or redundant compression capabilities, an LNG production and storage plant can utilize equipment and subsystems of the UGS facility, even in concurrent operation. Consequently, co-location and integration can increase the natural gas storage at a UGS facility by 15-50% for about 50% of the capital cost of adding a stand-alone LNG peak-shaving facility of the same capacity. Moreover, it should be appreciated that by using natural gas that is already at pipeline pressure for delivery to the UGS facility, compression requirements to a pressure above the about 660 psia critical pressure for more efficient and higher yields of LNG requirements are not only reduced but can also be satisfied by one or more redundant compressors and aftercoolers in the compression system at the UGS facility.

In one aspect of the inventive subject matter, the inventors contemplate a natural gas storage facility comprised of a storage reservoir to which an injection compressor is fluidly coupled and wherein the injection compressor is configured to compress a natural gas feed stream from a lower pressure to a natural gas injection pressure. Contemplated storage facilities will further comprise a liquefied natural gas (LNG) production unit fluidly coupled to the injection compressor and configured to receive from the injection compressor at least a portion of the natural gas feed stream at a pressure above the lower pressure or at the natural gas injection pressure as an LNG feed stream, and the LNG production unit is further configured to liquefy at least some of the LNG feed stream for storage in a co-located LNG storage tank.

In this context it should be appreciated that the term "injection compressor" as used herein refers to a compressor that functions as a compressor for natural gas injection into a storage location (typically geological formation). However, it should be appreciated that such injection compressor may also serve alternate functions in addition to natural gas injection into a storage location to accommodate specific needs. For example, as reservoir pressure declines due to seasonal change or earlier high withdrawal rates, the injection compressor may also operate as a withdrawal compressor to move gas from the storage facility to the pipeline since pipeline pressures are higher than reservoir pressures (plus pressure drop to deliver to the pipeline).

Most typically, but not necessarily, the storage reservoir is an underground formation for natural gas storage, and/or the injection compressor module is a collection of redundant parallel injection compressors that provide excess compression capacity. It is further contemplated that the LNG production unit and the UGS storage facility are configured to allow concurrent storage operation and send-out operation. Further, to increase pipeline gas supply resiliency, it is possible to configure the LNG facility with a several-MW Genset to extract, pump, compress, vaporize, and send out gas to the pipeline in the event an extreme weather event or grid power outage impedes the UGS extraction and send out operations. In further contemplated embodiments, the lower pressure of the pipeline natural gas feed stream is about 450 psia, and the UGS natural gas injection pressure is above the lower pressure and above about 800 psia.

Additionally, it is contemplated that the LNG facility is configured to produce nominally 100,000 gallons of LNG/day, and in most cases, the LNG facility will further comprise an LNG storage tank. Where desired, an LNG over-the-road truck tanker loading system may also be included. In still further embodiments, it is contemplated that the LNG production unit is also configured to recompress the vapor portion and to combine the recompressed vapor portion with the natural gas feed stream at the lower pressure or the natural gas feed stream at the pressure above the lower pressure or at the natural gas injection pressure. Typically, but not necessarily, the LNG production unit will comprise a pre-treatment unit to allow for the removal of CO2, H2S, H2O, and/or an odorant from the LNG feed stream. Advantageously, it should be appreciated that the UGS reservoir facility and the LNG production unit may be configured to share a power source, a power backup system, a metering sensor, a measuring sensor, and/or a control center.

Therefore, the inventors also contemplate a method of temporarily storing extra reserve natural gas that includes a step of receiving from a pipeline or underground reservoir at a natural gas storage facility a natural gas feed stream, wherein the natural gas storage facility comprises at the same location a storage reservoir and a liquefied natural gas (LNG) production unit. In another step, an injection compressor is used to compress a first portion of the natural gas feed stream from a lower pressure to a natural gas injection pressure and feeding the first portion of the natural gas at the injection pressure into the underground storage reservoir. In a still further step, the injection gas compressor is also used to compress a second portion of the natural gas feed stream to a pressure above the lower pressure or to the natural gas injection pressure, and the second portion of the natural gas feed stream is then fed at the pressure above the lower pressure at the natural gas supply pressure of the LNG production unit to thereby produce LNG. Most typically, the LNG is then fed into an LNG storage tank. Temporary storage then concludes with a step of withdrawing natural gas from the storage reservoir and feeding the withdrawn natural gas to the pipeline, and a step of vaporizing the LNG and feeding the vaporized LNG to the pipeline and/or the storage reservoir, wherein these steps may be performed concurrently or sequentially to increase send out supply resiliency.

In a typical embodiment, the storage reservoir is an underground formation for natural gas storage, and the injection compressor is a redundant injection compressor or a compressor having excess compression capacity. As will be readily appreciated, the injection compressor can concurrently produce the first and second compressed portions of the natural gas feed stream. In further typical examples, the lower pressure of the natural gas feed stream may be between 450-800 psia, and/or the pressure above the lower pressure or the natural gas injection pressure may be between 800 and 1,400 psia.

As desired, contemplated methods will further include a step of withdrawing at least a portion of the LNG for shipment as an LNG product (e.g., using an LNG terminal for loading an LNG truck). Additionally, contemplated methods may further include a step of dehydrating the withdrawn natural gas prior to feeding the withdrawn natural gas to the pipeline. As will be readily recognized, there are numerous manners of producing LNG known in the art, but it is at least in some embodiments contemplated that the LNG production unit liquefies at least some of the second portion of the compressed natural gas feed stream via pressure reduction to so form the LNG and a vapor portion. The vapor portion may then be recompressed and fed to the pipeline or to the storage reservoir.

As noted above, it is contemplated that the steps of (a) withdrawing natural gas from the storage reservoir and feeding the withdrawn natural gas to the pipeline and (b) vaporizing the LNG and feeding the vaporized LNG to the pipeline and/or the storage reservoir can be performed concurrently. In further advantageous aspects, it should be appreciated that the LNG production unit and the storage reservoir share various components and systems, including a common operations center, a common security center, a common power supply system, and/or a common power backup system. Likewise, it should be recognized that the LNG production unit and the storage reservoir can be fluidly coupled to a common metering unit and/or a common measurement unit.

Thus, and viewed from a different perspective, the inventors also contemplate a method of intermittent and on-demand generation of LNG that includes a step of compressing in a redundant natural gas compressor a natural gas feed stream having a lower pressure to produce a natural gas delivery stream having a higher pressure. The natural gas delivery stream is delivered to a UGS delivery destination during a first interval of operation of the natural gas compressors, while at least a portion of the natural gas delivery stream is delivered to a liquefied natural gas (LNG) production unit during a second interval of operation of the natural gas compressor to produce LNG.

For example, contemplated natural gas compressors at a UGS facility include a redundant natural gas compressor and a natural gas compressor having excess compression capacity. In view of the above, it is therefore contemplated that the lower pressure of the natural gas pipeline feed stream can be between 450-800 psia, and/or that the higher pressure of the pipeline natural gas delivery stream can be between 800 and 1,400 psia. Therefore, the natural gas feed stream may be a feed stream to a natural gas storage facility, and/or the delivery destination may be an underground formation for natural gas storage or a natural gas transmission pipeline. In further exemplary uses, the first interval of operation of the natural gas compressor may be a filling operation of a UGS natural gas storage facility, while the second interval of operation of the natural gas compressor may be used to provide LNG for a peak demand operation.

In another aspect of the inventive subject matter, the inventors contemplate a method of using redundant natural gas compression capacity in a facility that processes a natural gas feed stream at a lower pressure, and that uses a natural gas compressor to produce a natural gas delivery stream at a higher pressure. Such a method will typically include a step of using the redundant natural gas compression capacity to produce a natural gas product stream at elevated pressure and a further step of delivering at least a portion of the natural gas product at the elevated pressure to a co-located LNG (liquefied natural gas) production unit.

Preferably, the redundant natural gas compression capacity is a redundant natural gas compressor, or a natural gas compressor having excess compression capacity. As will be readily recognized, the redundant natural gas compression capacity can be used simultaneously when the natural gas compressor is used to produce the natural gas delivery stream at a higher pressure. In typical examples of such methods, the lower pressure of the natural gas feed stream may be between 450-800 psia, and the higher pressure of the natural gas delivery stream may be between 800 and 1,400 psia, while the elevated pressure of the natural gas product stream may be between 800 and 1,400 psia.

Most typically, the LNG production unit will include a natural gas open-cycle expansion stage, and/or the LNG production unit can use at least one turboexpander for pressure reduction and at least partial condensation of the natural gas product stream. Additionally, it is contemplated that the LNG production unit also produces a vapor portion that is recompressed and combined with the natural gas feed stream at the lower pressure or the natural gas delivery stream at the higher pressure.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWING

FIG. 5 is a flowchart depicting a method of enhanced intermittent and on-demand natural gas storage for resilient supply of pipeline natural gas.

DETAILED DESCRIPTION

Figure 1:
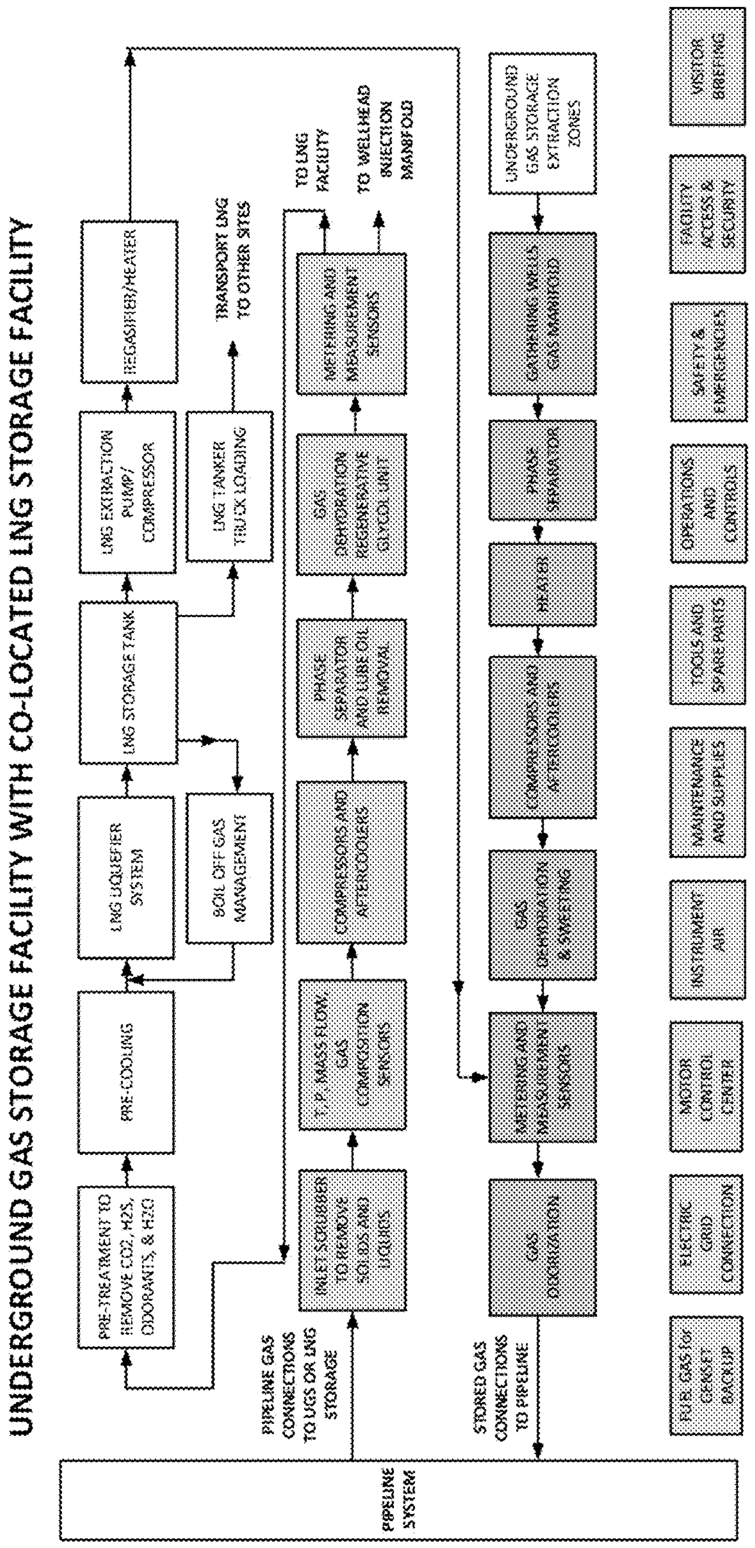
FIG. 1 is a schematic exemplary illustration of a plant with a co-located UGS facility and an LNG production and storage plant in which white boxes (top row) indicate plant components for LNG production and storage, light gray boxes (second and bottom row) indicate shared components for the UGS facility and LNG production and storage, and dark gray boxes (third row) indicate components for the UGS facility.

The inventors have conceived various systems and methods of integrating and co-locating an LNG production and storage plant with a UGS facility to increase storage capacity for natural gas in which the LNG production and storage plant and the UGS facility share one or more components and subsystems. As such, integration can not only significantly increase the storage capacity, but such an increase can be achieved at a substantial reduction of capital and operational expenses. Indeed, it should be appreciated that numerous existing components of the UGS facility can be shared with the LNG production and storage plant, including land and associated infrastructure (e.g., roads, grading, security fencing, operational buildings), connections to/from existing pipelines and meter stations, integration with existing controls, instrumentation, and power distribution systems, and particularly (redundant) compressors and aftercoolers in the UGS compression system. Moreover, the so-produced LNG may also be used for tanker delivery of LNG (e.g., for short-term pipeline maintenance or replacement, requiring bypassing pipeline natural gas supply around the repair site by pressurizing and vaporizing the delivered LNG for downstream customers). Of course, it should be recognized that contemplated configurations and methods need not be limited to a retrofit but may also be implemented in upgrades of an existing facility (e.g., where a new compressor is installed) or in a greenfield installation of a new facility.

In this context, it should be appreciated that most UGS facilities (e.g., emptied aquifers, depleted gas/oil fields, and salt caverns) are operated in various manners depending on the season and commercial structure of their capacity. Typically, they are kept close to a full state, so they are ready to deliver additional gas into the pipeline network as required to meet user natural gas demands, and most of their process equipment and capabilities are used only a small fraction of the time. One consequence of this intermittent need is that the multiple subsystems in such facilities are on standby and available for other possible uses that could augment their primary purpose. When the storage facility is filled to its safe maximum operating pressure, the compressors, and associated process equipment are shut down and become redundant until a peak demand event that requires extraction from the underground storage, dehydration, and any necessary compression before re-injection into the pipeline. Although the three types of UGS facilities in different locations may have different duty cycles, process equipment may be idle for days, months, or longer. While the equipment may be idle, the entire storage facility is continuously monitored and maintained during quiescent periods to be ready for immediate use. Many existing underground natural gas storage facilities were designed and built several decades ago. Over the last four decades, the average use of natural gas as an important US energy source has increased by about 62%. Consequently, the natural gas peak demand loads in the pipeline network have significantly increased, and utilities strive to increase their reserve natural gas storage capacity.

It should further be appreciated that the compression systems at a UGS facility are often designed to meet peak demand send-out flow rates rather than the smaller storage refilling flow rates. During low-demand and lower-priced gas periods, natural gas can be drawn from the pipeline at high or low supply pressure to replenish extracted amounts and completely refill the underground storage formation within 3-4 months of continuous operation. Although each underground gas storage facility has unique operating characteristics, it is common that the compression systems and associated process equipment will be idle or running below design capacity for much of the time. This is especially true because peaking facilities need to be exceptionally reliable. This often means a duty and spare for each compression service installed, almost doubling the number of compressors available at a UGS facility.

In a like manner, additional process equipment will also lay dormant for extended periods of time, and typical equipment includes interconnecting pipes to/from the pipeline, pre-purification slug catchers and filters, dehydration equipment on the surface connected to the extraction wells, multiple gas flow control valves and instrument air and other utility systems, instrumentation to measure temperature, pressure, flow rate, gas composition, flammable gas detectors, flame detectors, and essential safety items, control room, IT communication means, and security cameras, electrical grid connections or backup genset power, tools and spare parts, controlled access site, and all-weather roads, as well as operation staff and associated support facilities.

On this backdrop, the inventors now contemplate systems and methods to increase natural gas storage at an existing underground gas storage facility by co-locating a natural gas liquefier that uses the under-used compression and associated gas processing equipment to inexpensively make LNG from pipeline feedstock for peak-shaving (and other) purposes. For example, a typical minimum plot area for a 1 Bcf LNG peak shaving plant is estimated to be about 150 acres, with approximately 10-15 acres for the core equipment, storage tank, control room, etc., and the larger remaining plant area is required for setbacks from the LNG storage tank and liquefier in the plant to comply with Federal Code CFR-193 for safe dispersion of an unexpected LNG release in any weather condition. Due to their nature as geological structures, UGS facilities usually have a large subsurface area and a much smaller surface area for peak-shaving operations. As a result, a typical UGS facility can easily co-locate a typical peak-shaving LNG facility. For example, a large aquifer at Jackson Prairie, WA, which has been developed for UGS, encompasses a surface area of about 3200 acres over the underground reservoir, while its operational facilities occupy about 5 acres near the adjacent pipeline. Thus, most natural gas UGS facilities have extra surface acreage to build and operate an integrated co-located LNG peak-shaving storage and supply resilience facility.

Table 1 below compares exemplary components/items of typical underground gas storage (UGS) facilities and above-ground peak shaver LNG storage facilities. As can be readily seen, many of the subsystems of a stand-alone LNG peak shaver facility are already available by co-locating the LNG plant with its redundant components at a UGS facility.

TABLE 1

| COMPONENTS/ITEMS | UGS PEAK SHAVER FACILITY | LNG PEAK SHAVER FACILITY |
|---|---|---|
| Natural Gas Transmission Pipeline | YES | YES |
| Interconnecting pipes to/from existing pipeline infrastructure | YES | YES |
| Pipeline ancillaries such as slug catchers, pig launchers/receivers, metering, odorization, and particulate filters | YES | YES |
| Purification modules to remove components that will freeze out in cryogenic HEX | NO | YES |
| Gas Compression systems that contain several parallel multistage compressors and aftercoolers | YES | YES |
| High-pressure injection wells drilled a few thousand feet into the underground structure | YES | NO |
| Low- and high-pressure withdrawal wells at different depths within the structure | YES | NO |
| Dehydration equipment on the surface for removal of excess water from the gas | YES | YES/NO |

TABLE 1-continued

| COMPONENTS/ITEMS | UGS PEAK SHAVER FACILITY | LNG PEAK SHAVER FACILITY |
|---|---|---|
| Interconnecting pipes among modules, flow control valves, and instrument air | YES | YES |
| Cryogenic heat exchangers | NO | YES |
| Cryogenic work-recovery turbo expanders | NO | YES |
| LNG storage tank | NO | YES |
| Cryogenic flash vessels and liquid-vapor phase separators | NO | YES |
| Boil off gas compression and storage tank support | NO | YES |
| Liquid extraction turbine pump to compress LNG to pipeline pressure | NO | YES |
| LNG to NG vaporization facilities for the maximum send-out flow rate to the pipeline | NO | YES |
| Instrumentation to measure temperatures, pressures, flow rates, gas compositions | YES | YES |
| Flammable gas detectors, flame detectors, and other items for safe operations | YES | YES |
| Electrical grid connections or genset power supply for the entire facility | YES | YES |
| Buildings with control room, IT communication means, and security cameras | YES | YES |
| Secure shed for tools, consumables, and spare parts | YES | YES |
| Controlled access site, all-weather roads | YES | YES |
| Operation and maintenance staff and associated support facilities | YES | YES |
| Support facilities for operations staff and visitors | YES | YES |

Figure 2:
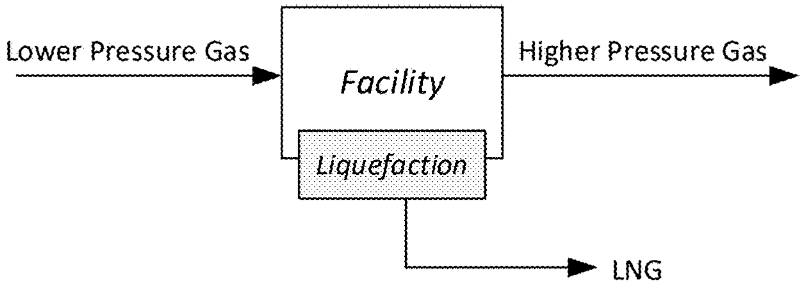
FIG. 2 is a high-level schematic exemplary illustration for an integrated UGS/LNG production and storage facility.

Based on the above comparison and further considerations discussed below, FIG. 1 schematically and exemplarily depicts a typical Block Process Flow Diagram for a 1 Bcf LNG storage facility that is co-located at and integrated with a comparable UGS facility, as discussed in more detail below. Here, the white boxes (top row) indicate plant components for LNG production and storage, the light gray boxes (second and bottom row) indicate shared components for the UGS facility and LNG production and storage, and the dark gray boxes (third row) indicate components for the UGS facility. As can be readily seen from FIG. 1, co-location of a UGS facility and LNG production and storage will significantly benefit from shared use of one or more of the common components/items, and FIG. 2 shows a high-level schematic exemplary illustration for an integrated UGS/LNG production and storage facility.

With respect to the use of pipeline gas and compression of the pipeline gas, it should be noted that integration with the UGS compressor system can significantly reduce liquefaction costs (e.g., in many cases up to 50%) and optionally also by using the work from a compressor-braked turbo-expander to compress a working gaseous refrigerant in a closed loop turbo-Brayton expander cycle that subcools the natural gas process stream to produce very high liquid yields. An open-cycle natural gas refrigeration cycle can use a turbo-expander instead of a J-T expander to increase cooling, which increases yield, and the work from the compressor-braked expander can be used to boost the pressure of the warmed vapor fraction from the flash vessel before it is returned to the suction side of the main compressor to be recycled.

Furthermore, it should be noted that a typical pressure range of natural gas in a pipeline network is between 450 and 1400 psia, while the natural gas pressure in an underground storage reservoir will depend upon the type of formation and how it is reliably and safely operated. Typical pressure ranges create four illustrative operational scenarios for the movement of natural gas between the pipeline and the underground storage reservoir. First, when user demand is low, the underground storage reservoir is not full, and the pipeline gas pressure exceeds the gas pressure in the underground formation, natural gas can be controllably injected directly into the formation via one or more injection wells. Second, when user demand from the pipeline is low, the underground storage reservoir is not full, but the pipeline gas pressure is less than the underground formation gas pressure, the pipeline gas can be controllably compressed by the multi-compressor/aftercooler system before it is injected into the formation. Third, when a peak user demand for pipeline gas occurs, the underground storage reservoir is not empty, and the pipeline pressure is less than the gas pressure in the underground formation, water-saturated gas is drawn out of the formation via extraction wells and sent through a dehydration module before it is re-injected into the pipeline. Fourth, when a peak user demand occurs, the underground storage reservoir is not empty, and pipeline pressure is greater than the gas pressure in the underground formation, water-saturated gas is extracted from the formation, sent through the dehydration module, and then through the compressor/aftercooler system before it is re-injected into the pipeline.

During a period when normal flows in the pipeline satisfy the user's demands and when the underground storage reservoir is full, the compressor and dehydration equipment are shut down into stand-by mode. During this time, pipeline natural gas can be delivered to the integrated and co-located system through the otherwise quiescent compressor system and dehydration module to a co-located LNG production unit. While shared functions and cost savings associated with integrating the LNG production and storage facilities into the UGS are significant, in further contemplated aspects, there are additional benefits with respect to liquefaction capital cost, power consumption, and thermodynamic efficiency, as exemplified in Table 2.

TABLE 2

| Integration | Capital Cost Savings | Production Improvement | Thermodynamic Efficiency Improvement |
|---|---|---|---|
| Feed gas compressed to above critical pressure (~660 psia) | Yes. ~10-20% reduction in CAPEX. Smaller piping and equipment. | Yes. ~10-20% production increase. | Yes. The enthalpy change of the NG process stream cooling curve matches sensible heat transfer from the gaseous refrigerant stream, resulting in ~10% improvement in efficiency due to smaller temperature approaches through the cryogenic heat exchangers. |
| Integration of compressed feed gas into an End-Flash of non-subcooled LNG. | Yes. ~5% reduction in unit production CAPEX. | Yes. Roughly 6% increase in production. | Possibly. Depends on the arrangement of cooling cycles and process conditions selected. |
| Open-cycle | Very significant | No. | No. Thermodynamic |

TABLE 2-continued

| Integration | Capital Cost Savings | Production Improvement | Thermodynamic Efficiency Improvement |
|---|---|---|---|
| NG expander loop integrated into liquefaction | reduction in CAPEX because compression already exists. The compressor system is typically the single largest CAPEX item within the liquefier system (~40-50% of liquefier system CAPEX) | Production is now linked to existing compression equipment. | efficiency may decrease because process conditions are dominated by prevailing conditions rather than optimal liquefaction cycle needs. |

As will be readily appreciated, the particular manner of liquefaction may vary considerably, and suitable liquefier cycle designs include a propane-precooled mixed refrigerant cycle, an i-pentane single mixed refrigerant cycle, a reverse-Brayton cycle with nitrogen expander cycle, an open cycle NG expander cycle, and a cascade cycle comprised of three thermally coupled Linde-Hampson cycles with different refrigerants, typically propane, ethylene, and an open cycle methane cold-end. Additional exemplary systems are shown in WO 2000/025060, U.S. Pat. Nos. 6,085,546, 6,378,330, 8,899,074, and WO 2003/072991.

It is further contemplated that suitable LNG liquefier systems will comprise known combinations of unit operations required to purify pipeline natural gas and cool and condense the natural gas into LNG, preferably in a manner that efficiently increases the overall liquefier yield by at least 3%, or at least 6%, or at least 9% (e.g., about 2-5%, or about 5-10%, such as 4%, 7%, 10%, etc.) as compared to conventional LNG liquefier plants. For example, systems and methods contemplated herein may use work recovered from the turbo-expander of a gaseous refrigerant in a closed-loop reverse-Brayton cycle refrigerator that cools, condenses, and as needed, subcools a pretreated natural gas stream to form LNG suitable for storage. Such a method will typically include using the redundant natural gas compression capacity to produce a natural gas process stream at an elevated pressure.

Depending on specific requirements for additional peak demand supplies of pipeline natural gas at a specific UGS facility, the LNG liquefiers described herein can make variable amounts of LNG ranging from 5,000 gpd to 250,000 gpd. The selection is facility-dependent, but a typical liquefier size, 100,000 gallons (378,500 liters) of LNG/day, makes about 12 million gallons within ~2-3 months, which equates to about 1 Bcf of extra stored gas at a UGS facility. Additionally, it should be recognized that the LNG production unit will receive substantially all the pipeline feed gas at higher pressures during at least some time of operation of the existing facility, thereby reducing compression requirements and operating expenses. Where desired, contemplated methods may further include a step of dehydrating and further purification of the feed gas stream to remove impurities that may freeze as the natural gas is cooled to LNG temperatures during liquefaction.

Most typically, the compressed natural gas storage facility is an underground formation, and/or the injection compressor system has excess compression capacity beyond that required for the underground storage facility. Therefore, the co-located LNG production unit and the underground storage facility may be configured to allow concurrent operation. Depending on the process configuration chosen, the LNG production unit may produce a warm natural gas vapor portion that is recompressed to the suction pressure of the compressor and combined with the natural gas feed stream at that same pressure. The inherent heat leak from ambient temperature into the LNG at about −260° F. (−163° C.) will cause some boil-off NG, which can also be compressed and sent back to the feed stream. While not limiting to the inventive subject matter, it is contemplated that the LNG production unit at the UGS facility may produce about 100,000 gallons of LNG/day. The LNG production unit may also produce a warm vapor portion that is recompressed and combined with the natural gas feed stream at the lower pressure or the natural gas delivery stream at the higher pressure. LNG will then be stored on-site in insulated tanks located adjacent to the underground storage facility. When natural gas customer demands peak, the LNG can be pumped from the storage tank to above the desired supply pressure and vaporized to be converted back into pipeline natural gas that may be used to supplement the UGS storage and send-out capability.

For example, LNG can be stored at a pressure of about 15 psia in large, above-ground, insulated 12.2-million-gallon tanks adjacent to the natural gas pipeline infrastructure. LNG can then be easily extracted from the storage tank with centrifugal, multi-stage pumps (such as those commercially available from ACD, Cosmodyne, or Ebarra/Elliott Group) mounted at the bottom of insulated pump wells extended to near the bottom of the tank. The controlled pumps compress the LNG to a pressure slightly above the natural gas pressure in the pipeline before it is sent to a vaporizer, where it is vaporized and heated to form pressurized natural gas suitable for re-injection (typically following odorization, metering, etc.) into the pipeline to meet the demand spike. The natural gas re-injection rate, pressure, and temperature can be scaled to meet pipeline peak demands.

If the LNG facility to the pipeline was configured with a Genset for several MW of power for the LNG extraction pump/compressor/vaporizer, and a connection to the pipeline adjacent to that of the UGS facility, if an unexpected event occurs where the UGS can't operate, the LNG send out capability provides the resilience of supply required to avoid purchasing gas on the spot market.

Additionally, it is contemplated that the co-located system will also include an LNG cryogenic tanker truck loading facility. This system could enable the facility owner (e.g., a gas utility company) to transport low-cost LNG to other locations within their natural gas pipeline network for backup for refueling LNG-fueled marine vessels or to provide regasified LNG for downstream gas supply during maintenance on a main pipeline. Each tanker load of about 10,000 gallons (37,850 liters) would be ready for use without disrupting the primary purpose of co-located gas storage, particularly with a 100,000 gpd LNG liquefier available to replenish the amount used in this manner.

Referring back to FIG. 2, an exemplary schematic of a configuration according to the inventive subject matter is depicted in which an underground gas storage facility receives a lower-pressure natural gas feed stream from a pipeline, for example, at a pressure of 450 psia, and in which the facility has a natural gas compressor that compresses the lower pressure natural gas stream to produce a natural gas delivery stream at a higher pressure, typically between 800-1200 psia, depending upon the type of underground storage formation. As will be readily appreciated, several NG compressors within the compression/aftercooler system may operate continuously or intermittently, and at least a portion of the natural gas delivery stream can be fed to an LNG liquefier system to produce LNG from the natural gas delivery stream.

Figure 3:
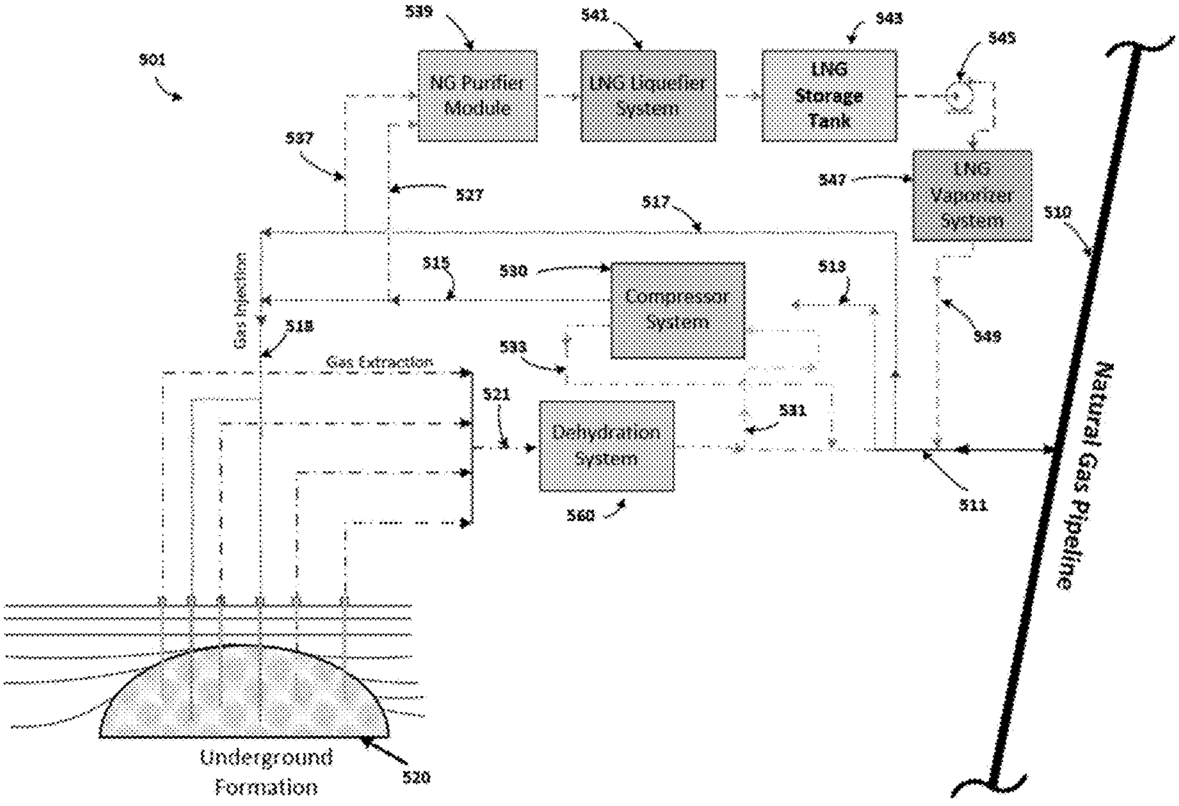
FIG. 3 is a more detailed schematic exemplary illustration for an integrated UGS/LNG production and storage facility that is coupled to a natural gas pipeline.

FIG. 3 shows a more detailed exemplary configuration in which a natural gas storage facility 501 receives natural gas feed stream 511 from a pipeline 510, for example, at a pressure of about 450-800 psia. To fill the storage volume in underground formation 520, natural gas feed stream 511 typically follows one of two paths. If the pressure of stream 511 is greater than the pressure in the underground storage formation 520, stream 511 bypasses the compressor as stream 517, which becomes stream 518 when stream 537 is set to zero (i.e., no natural gas is being liquefied) and is directly injected into formation 520. If the pressure of stream 511 is less than the pressure in formation 520, stream 511 is sent to the compressor system 530 as stream 513, which becomes stream 515 after it is compressed to a pressure greater than the pressure in formation 520. When stream 527 is set to zero (i.e., no natural gas is being liquefied), stream 515 becomes stream 518, which is injected into formation 520. When formation 520 reaches its full design pressure, e.g., 800 psia, such as in Jackson Prairie, WA, no further gas 511 can be injected into formation 520.

In this instance, compressor system 530 is shut down and put into quiescent mode, which may last for weeks, months, or longer. This quiescent period is an excellent time to utilize the compressor system to increase the natural gas storage at the facility by making LNG in liquefier system 541 and storing it in insulated tank 543. This is accomplished by withdrawing feed gas 511 from pipeline 510 and converting it into LNG. If the pressure in stream 511 is already high enough for the liquefier, e.g., 800-1200 psia, the compressor system 530 can be bypassed as stream 517, which becomes stream 537 because the flow in stream 518 is set to zero. In most cases, the natural gas in stream 537 has residual water, carbon dioxide, hydrogen sulfide, and mercaptan odorants that freeze out in the coldest subsystems within the liquefier, so those impurities are removed to ppm or less levels in purifier module 539 before being sent into the liquefier system 541 which converts most of the natural gas feed stream into LNG that is stored in insulated tank 543.

If stream 511 is at low pressure, e.g., 450-500 psia, it becomes stream 531, which is sent to restarted compressor system 530 to increase the pressure to above critical pressure (i.e., about 660 psia), such as 800-1200 psia, in stream 515 as required by the liquefier system. This stream becomes 527 because stream 518 has zero flow when the formation is full. As the pipeline natural gas in stream 527 has residual water, carbon dioxide, hydrogen sulfide, and mercaptan odorants that freeze out in the coldest subsystems within the liquefier, these impurities are removed to ppm or lower levels in purifier module 539 before being sent into the liquefier system 541 which converts most of the natural gas feed stream into LNG that is stored in insulated tank 543. A small warm low-pressure vapor portion of streams 527 or 537 produced in liquefier system 541 can be recompressed with a compressor-braked turbo-expander (not shown) within liquefier system 541 and be recombined with the natural gas feed stream 511 at its feed pressure. When the LNG storage tank 543 (e.g., nominally 12.2 million gallons volume) is full at about 15-18 psia, the liquefier may be shut down or intermittently used to make auxiliary LNG for tanker truck delivery to remote utility customers or for planned short-term (several days) operating pipeline maintenance procedures where LNG is vaporized and injected into the downstream pipeline to supply existing customer demand.

When a peak demand event occurs, additional natural gas from LNG storage tank 543 can be drawn from tank 543 by compressing pump 545, warmed to near ambient temperature in vaporizer module 547 to create stream 549 for injection into pipeline 510. Alternatively, water-saturated natural gas stream 521 can be extracted from the underground formation 520 by extraction wells, dehydrated in module 560 (e.g., using adsorption with molecular sieves or absorption with glycols), and if its pressure is higher than the pipeline pressure, injected into pipeline 510. If the pressure of stream 521 is lower than the pipeline pressure, after going through module 560, stream 531 is compressed in compressor system 530 to stream 533, which can be reinjected into pipeline 510. In addition, it should be appreciated that over-pressurization of a formation can be avoided using contemplated systems and methods as an increase in storage pressure due to warming can be solved by liquefaction of gas from the UGS in the LNG production and storage unit.

It should be appreciated that the injection compressor system will usually have multiple gas compressors operating in parallel (e.g., as idle equipment or equipment to increase the flow of compressed NG for injection). In such a situation, at least one of the multiple compressors may be used to provide the delivery stream 527 to the LNG liquefier system. If the underground gas storage reservoir is full and the LNG storage tank is full, the compressor system 530 will be shut down, and the compressors will be in standby mode.

Of course, it should be appreciated that natural gas storage facilities may include one, two, or more LNG storage tanks to increase the reserve storage capacity or produce additional LNG for other uses by the utility with larger liquefier plants if required to produce sufficient LNG within the 2-3 months of low-demand periods for pipeline gas (when its price is also lowest), which may receive compressed feed gas from the compressor system as shown in FIG. 3.

Figure 4A:
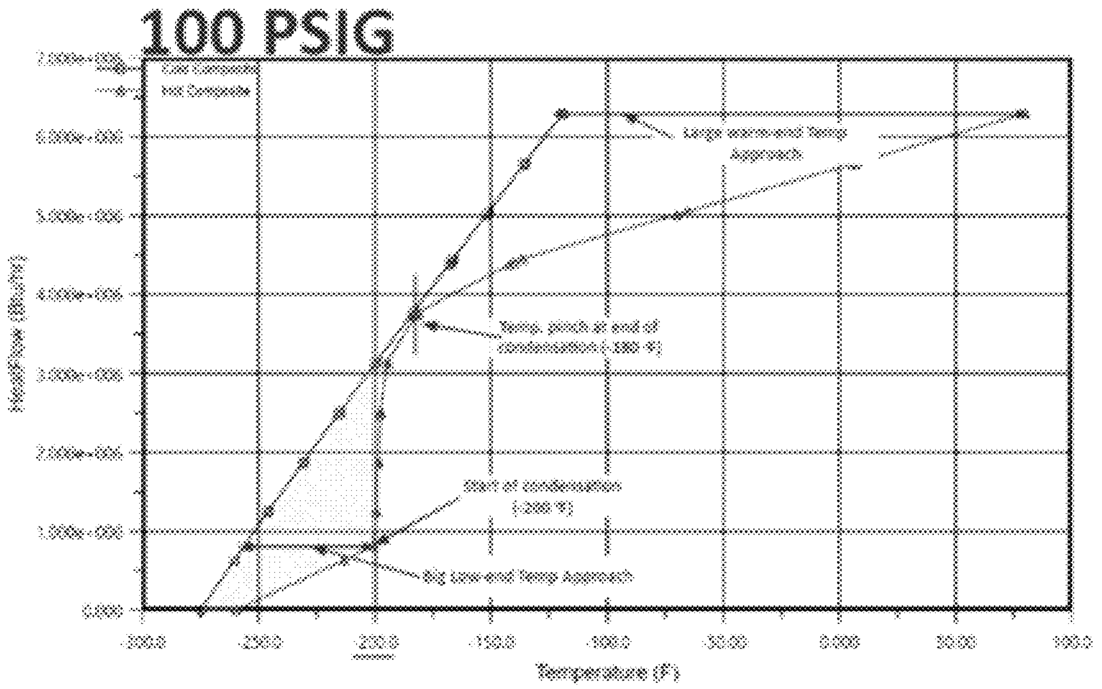
FIG. 4A-4D are graphs depicting results of exemplary HYSYS models demonstrating that increasing the pressure of pipeline gas from 400 psia to 1,000 psia using the redundant compressors at a UGS increases LNG liquefier efficiency by about 10% by reducing the approach temperatures while cooling the natural gas in the process heat exchanger.
Figure 4B:
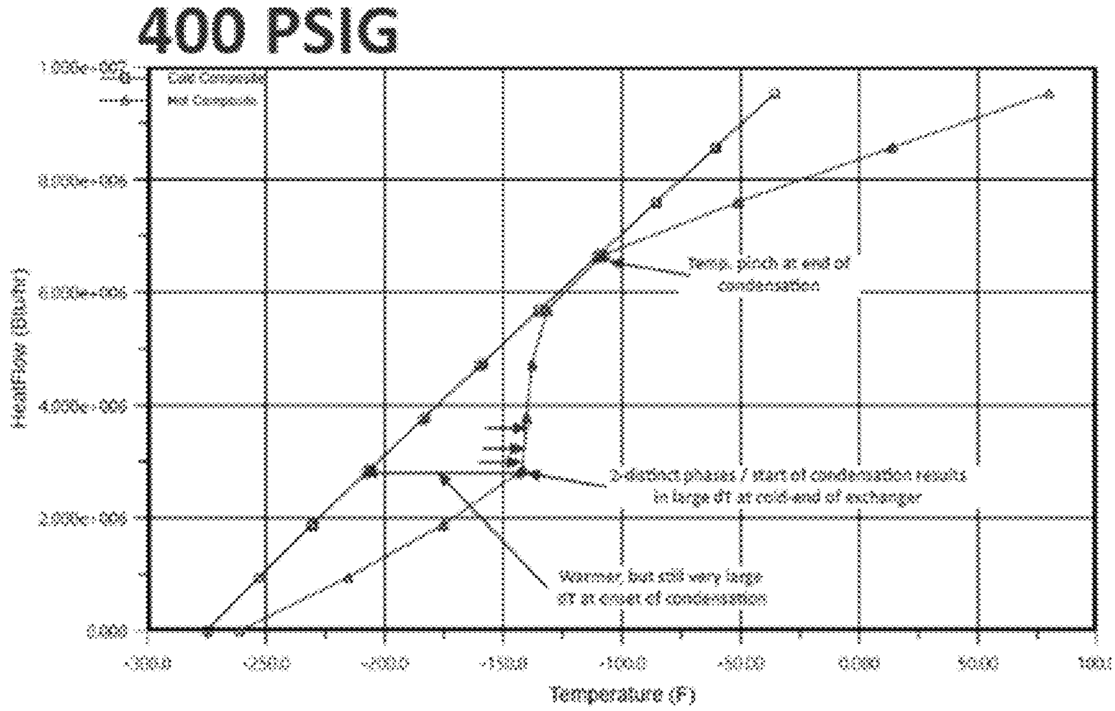
Figure 4C:
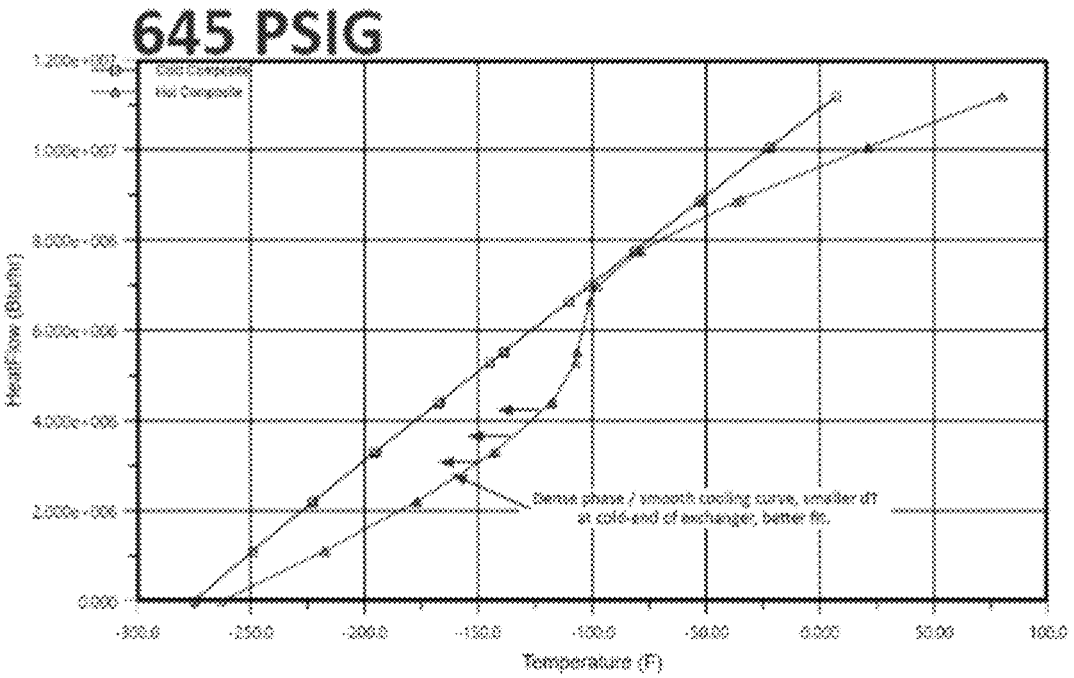
Figure 4D:
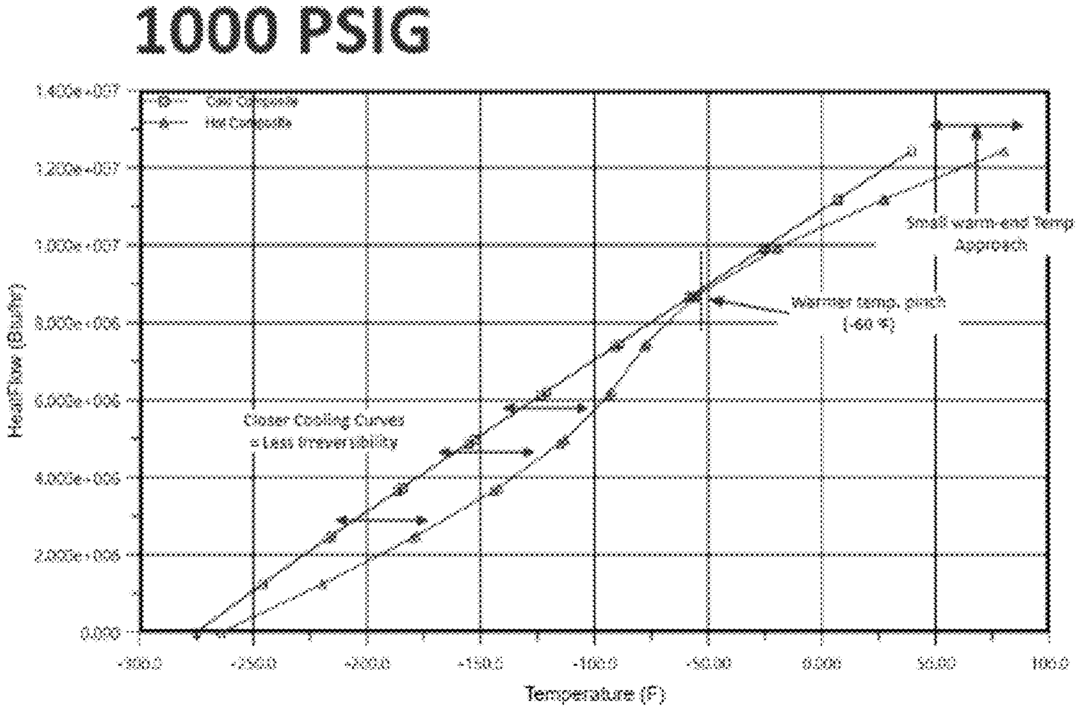

With further respect to the compression of natural gas from the pipeline pressure to a pressure suitable for liquefaction (e.g., above critical pressure), it should be appreciated that compression of the natural gas to about 1000 psia (e.g., 800 psia to 1,200 psia) increases yield and thermodynamic efficiency, reduces capital costs by use of smaller pipes, etc. for the same mass flow rate. FIGS. 4A-4D depict exemplary results of four HYSYS models that show how increasing the pressure of pipeline gas from 400 psia to 1000 psia using the redundant compressors at a UGS facility to provide higher pressure process gas into an LNG liquefier increases liquefaction efficiency by about 10% by reducing the approach temperatures during cooling the natural gas in the process heat exchanger. Here, FIG. 4A depicts compression to 100 psia, FIG. 4B depicts compression to 400 psia, FIG. 4C depicts compression to 645 psia, and FIG. 4D depicts compression to 1,000 psia. Here, it should be noted that most stand-alone LNG liquefier plants have compressors to compress low-pressure natural gas feedstock such as <100 psia up to 900-1000 psia at a considerable cost for the LNG plant. In contrast, contemplated systems and methods avoid compressor system CAPEX by co-locating with an existing UGS, and because the pipeline gas at a UGS site is typically already at a pressure of at least 400 psia, which also reduces OPEX due to reduced compression power requirements.

It should be particularly appreciated that underground gas storage facilities (e.g., in aquifers, depleted fields, or salt domes) form an important part of natural gas infrastructure. In addition to being connected to a pipeline, at a minimum, such facilities have injection wells, withdrawal wells, gas compression, and gas dehydration facilities along with associated piping, separator, valving, instrumentation, controls, etc. In typical installations, gas compression at such facilities is often (a) sized to inject natural gas to fill a fraction of the total storage facility in several months in an average year; (b) installed with some redundancy (and particularly redundant gas compressors) to ensure gas send-out capacity is reliable; and (c) operated intermittently on a seasonal or periodic basis. Consequently, regardless of the location of compressors in the process, it is typical for the installed compression at the underground gas storage facility to be heavily underutilized. Because natural gas compressors place a substantial capital expense demand on the construction of a storage facility, under-utilization of such equipment is highly uneconomical. Contemplated co-location of LNG production plants that take advantage of under-utilized natural gas compression will, therefore, significantly improve the economics of construction and operation. Moreover, LNG can be produced using contemplated systems and methods in a decentralized manner (as opposed to being limited to locations such as gas terminals, gas producers, or gas consumers) and will allow sufficient production and storage to conveniently transport LNG to natural gas pipeline repair sites that tanker-delivered LNG for vaporization to supply customers downstream of the repair site.

Therefore, it should be recognized that LNG can be produced on demand and intermittently by co-location of an LNG liquefier system with a facility that already has a natural gas compressor that is generally used for a purpose other than LNG production. In such methods, a natural gas feed stream with a lower pressure is compressed by the compressor to produce a natural gas delivery stream with a higher pressure. This natural gas delivery stream is then delivered to a delivery destination (e.g., pipeline or storage facility) during the first interval of operation of the natural gas compressor. Such a mode is typically the operational mode for the original facility before co-location with the LNG production unit. Advantageously, at least a portion of the natural gas delivery stream is also delivered to an LNG liquefier system during a second interval of operation (e.g., on-demand production of LNG or to increase peak output of natural gas) of the natural gas compressor.

Most typically, natural gas compressed by the compressor system will have a composition compliant with pipeline and end-use standards. However, it should be noted that pipeline natural gas may include limited concentrations of water, CO2, and/or C3+ or other higher hydrocarbon components that must be removed before liquefaction to avoid freezing out in heat exchangers or other cryogenic process equipment. Such removal can be done using methods well-known in the art. Among other benefits, it should be noted that upon reinjection of vaporized LNG from the LNG production and storage unit into the pipeline, the overall purity of pipeline gas increases as inerts like CO2 and N2 are reduced or no longer present in the vaporized LNG, which yields a more desirable gas composition during peak demand. However, it should be noted that contemplated systems and methods will not include further processing equipment to materially change the natural gas composition (e.g., to produce a leaner pipeline gas in conjunction with a liquid natural gas liquid (NGL) stream). Thus, in preferred aspects, the natural gas composition before compression and after compression and/or liquefaction will not substantially change (excluding inadvertent or minor changes due to the specific conditions and processes of liquefaction).

As noted above, it should also be appreciated that all known LNG processes that use a compressed natural gas stream as input material and that use the refrigeration generated during pressure reduction of the compressed natural gas stream are deemed suitable. Therefore, especially preferred LNG production units will include one or more turboexpanders to reduce pressure and partially condense the input material. However, closed-cycle refrigeration cycles are also deemed appropriate, including those using refrigerants that are various hydrocarbons, inert gases, and mixtures as cryogenic fluids.

ASPECTS

The present disclosure will be better understood upon reading the following numbered aspects, which should not be confused with the claims. In some instances, each of the aspects described below can be combined with other aspects, including combined with other aspects described elsewhere in the disclosure or other aspects from the examples below, without departing from the spirit of the disclosure.

1. A natural gas storage facility, comprising: a storage reservoir; an injection compressor fluidly coupled to the storage reservoir, wherein the injection compressor is configured to compress a natural gas feed stream from a lower pressure to a natural gas injection pressure; and a liquefied natural gas (LNG) production unit fluidly coupled to the injection compressor and configured to receive from the injection compressor at least a portion of the natural gas feed stream at a pressure above the lower pressure or at the natural gas injection pressure as an LNG feed stream; and wherein the LNG production unit is further configured to liquefy at least some of the LNG feed stream via pressure reduction to so form LNG and a vapor portion.

2. The natural gas storage facility of aspect 1, wherein the storage reservoir is an underground formation for natural gas storage.

3. The natural gas storage facility of aspect 1, wherein the injection compressor is a redundant injection compressor or a compressor having excess compression capacity.

4. The natural gas storage facility of aspect 1, wherein the LNG production unit and the storage facility are configured to allow concurrent operation.

5. The natural gas storage facility of aspect 1, wherein the lower pressure of the natural gas feed stream is between 450-800 psia, wherein the pressure above the lower pressure or the natural gas injection pressure is between 800 and 1,400 psia.

6. The natural gas storage facility of aspect 1, wherein the LNG facility is configured to produce nominally 100,000 gallons LNG/day.

7. The natural gas storage facility of aspect 1, wherein the LNG facility further comprises an LNG storage tank.

8. The natural gas storage facility of aspect 1, further comprising an LNG truck loading terminal.

9. The natural gas storage facility of aspect 1, wherein the LNG production unit is further configured to recompress the vapor portion and to combine the recompressed vapor portion with the natural gas feed stream at the lower pressure or the natural gas feed stream at the pressure above the lower pressure or at the natural gas injection pressure.

10. The natural gas storage facility of aspect 1, wherein the LNG production unit further comprises a pre-treatment unit that is configured to allow removal of CO2, H2S, H2O, and/or an odorant from the LNG feed stream.

11. The natural gas storage facility of aspect 1, wherein the storage reservoir and the LNG production unit are configured to share a power source, a power backup system, a metering sensor, a measuring sensor, and/or a control center.

Figure 6:
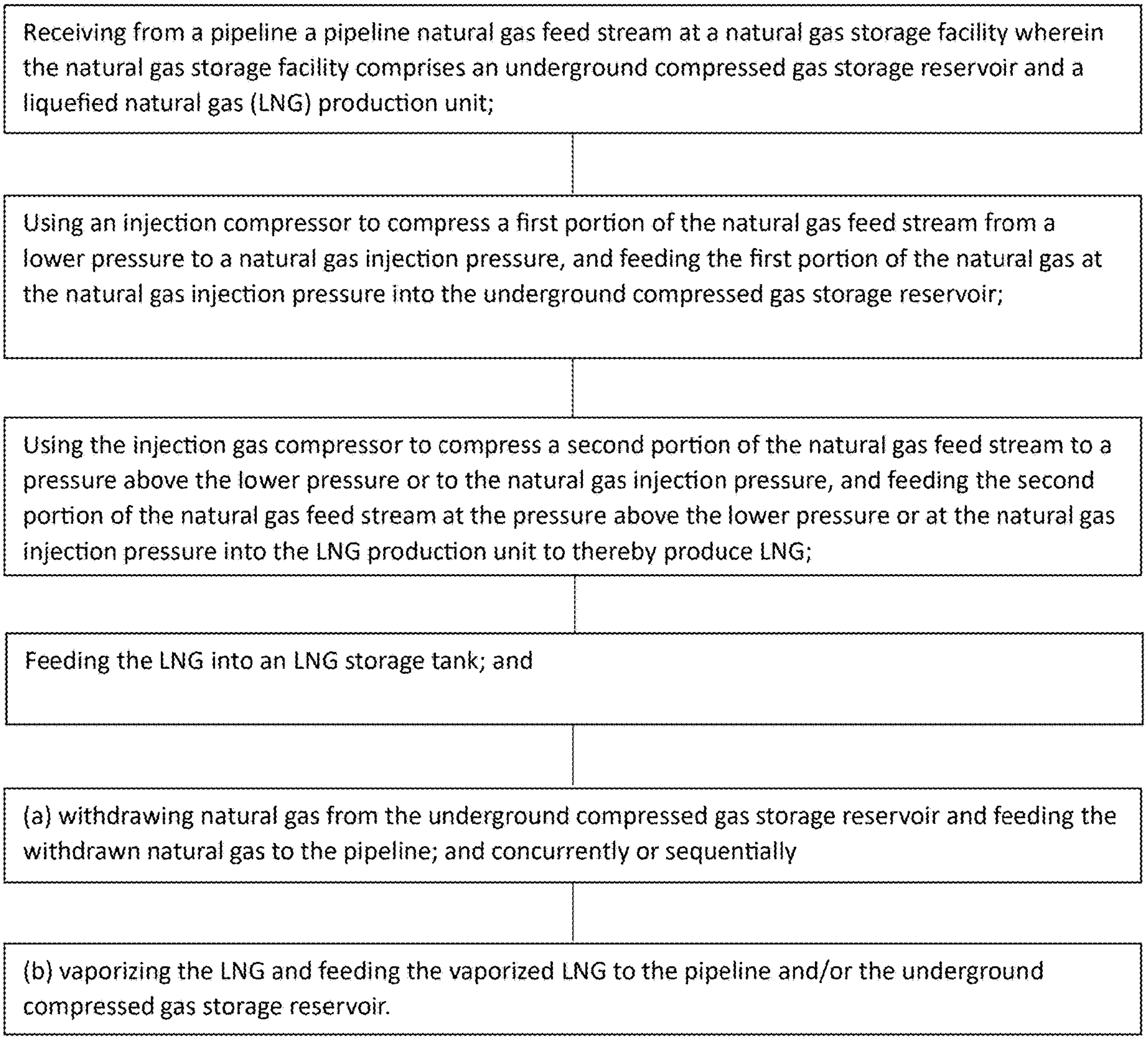
FIG. 6 is a flowchart depicting method of enhanced intermittent and on-demand storage of pipeline natural gas.

12. A method of enhanced intermittent and on-demand storage of pipeline natural gas, comprising: receiving from a pipeline a pipeline natural gas feed stream at a natural gas storage facility wherein the natural gas storage facility comprises at the same location an underground compressed gas storage reservoir and a liquefied natural gas (LNG) production unit; using an injection compressor to compress a first portion of the natural gas feed stream from a lower pressure to a natural gas injection pressure, and feeding the first portion of the natural gas at the injection pressure into the storage reservoir; using the injection gas compressor to compress a second portion of the natural gas feed stream to a pressure above the lower pressure or to the natural gas injection pressure, and feeding the second portion of the natural gas feed stream at the pressure above the lower pressure or at the natural gas injection pressure into the LNG production unit to thereby produce LNG; feeding the LNG into an LNG storage tank; and (a) withdrawing natural gas from the storage reservoir and feeding the withdrawn natural gas to the pipeline; and concurrently or sequentially (b) vaporizing the LNG and feeding the vaporized LNG to the pipeline and/or the storage reservoir. See FIG. 6 which depicts an exemplary flowchart of the method according to Aspect 12.

13. The method of aspect 12, wherein the storage reservoir is an underground formation for natural gas storage.

14. The method of aspect 12, wherein the injection compressor is a redundant injection compressor or a compressor having excess compression capacity.

15. The method of aspect 12, wherein the injection compressor concurrently produces the first and second compressed portions of the natural gas feed stream.

16. The method of aspect 12, wherein the lower pressure of the natural gas feed stream is between 450-800 psia, wherein the pressure above the lower pressure or the natural gas injection pressure is between 800 and 1,400 psia.

17. The method of aspect 12, further comprising a step of withdrawing at least a portion of the LNG for shipment as an LNG product.

18. The method of aspect 12, further comprising a step of dehydrating the withdrawn natural gas prior to feeding the withdrawn natural gas to the pipeline.

19. The method of aspect 12, wherein the LNG production unit liquefies at least some of the second portion of the compressed natural gas feed stream via pressure reduction to so form the LNG and a vapor portion.

20. The method of aspect 12, wherein the vapor portion is recompressed and fed to the pipeline or storage reservoir.

21. The method of aspect 12, wherein the steps of (a) withdrawing natural gas from the storage reservoir and feeding the withdrawn natural gas to the pipeline and (b) vaporizing the LNG and feeding the vaporized LNG to the pipeline and/or the storage reservoir are performed concurrently.

22. The method of aspect 12, wherein the LNG production unit and the storage reservoir share a common operations center, a common security center, a common power supply system and/or a common power backup system.

23. The method of aspect 12, wherein the LNG production unit and the storage reservoir are fluidly coupled to a common metering unit and/or a common measurement unit. The natural gas storage facility of aspect 1, wherein the underground storage reservoir and the LNG liquefier and storage unit are configured to share a power source, a power backup system, a metering sensor, a measuring sensor, and/or a control center.

24. The method of aspect 12, wherein using redundant natural gas compression capacity in a facility that processes a pipeline natural gas feed stream at a lower pressure and uses the redundant natural gas compression capacity to produce a compressed natural gas stream at an elevated pressure and deliver at least a portion of the compressed pipeline natural gas at the elevated pressure to an LNG production unit.

25. A method of intermittent and on-demand generation of LNG, comprising: compressing in a natural gas compressor a natural gas feed stream having a lower pressure to produce a natural gas delivery stream having a higher pressure; delivering the natural gas delivery stream to a delivery destination during a first interval of operation of the natural gas compressor; and delivering at least a portion of the natural gas delivery stream to a liquefied natural gas (LNG) production unit during a second interval of operation of the natural gas compressor to produce LNG.

26. The method of aspect 25, wherein the natural gas compressor is a redundant natural gas compressor or a natural gas compressor having excess compression capacity.

27. The method of aspect 25, wherein the lower pressure of the natural gas feed stream is between 450-800 psia, and wherein the higher pressure of the natural gas delivery stream is between 1,000 and 1,400 psia.

28. The method of aspect 25, wherein the natural gas feed stream is a feed stream to a natural gas storage facility or an LNG regasification station.

29. The method of aspect 25, wherein the delivery destination is an underground formation for natural gas storage or a natural gas transmission pipeline.

30. The method of aspect 25, wherein the first interval of operation of the natural gas compressor is a filling operation of a natural gas storage facility.

31. The method of aspect 25, wherein the second interval of operation of the natural gas compressor is a peak demand operation.

32. The method of aspect 25, wherein the LNG production unit comprises an open-cycle expansion stage.

33. The method of aspect 25, wherein the LNG production unit further comprises an LNG storage tank.

34. The method of aspect 25, further comprises a step of filling an LNG tanker truck with the LNG.

35. A method of using redundant natural gas compression capacity in a facility that processes a natural gas feed stream at a lower pressure and that uses a natural gas compressor to produce a natural gas delivery stream at a higher pressure, comprising: using the redundant natural gas compression capacity to produce a natural gas product stream at an elevated pressure and delivering at least a portion of the natural gas product at the elevated pressure to an LNG (liquefied natural gas) production unit.

36. The method of aspect 35, wherein the redundant natural gas compression capacity is a redundant natural gas compressor.

37. The method of aspect 35, wherein the redundant natural gas compression capacity is a natural gas compressor having excess compression capacity.

38. The method of aspect 35, wherein the redundant natural gas compression capacity is used simultaneously when the natural gas compressor is used to produce the natural gas delivery stream at the higher pressure.

39. The method of aspect 35, wherein the lower pressure of the natural gas feed stream is between 450-800 psia, wherein the higher pressure of the natural gas delivery stream is between 1,000 and 1,400 psia, and wherein the elevated pressure of the natural gas product stream is between 1,000 and 1,400 psia.

40. The method of aspect 35, wherein the LNG production unit comprises a natural gas open-cycle expansion stage.

41. The method of aspect 35, wherein the LNG production unit uses at least one turboexpander for pressure reduction and at least partial condensation of the natural gas product stream.

42. The method of aspect 35, wherein the LNG production unit further produces a vapor portion that is recompressed and combined with the natural gas feed stream at the lower pressure or the natural gas delivery stream at the higher pressure.

43. A method of enhanced intermittent and on-demand storage for resilient supply of pipeline natural gas, comprising: receiving from a pipeline a pipeline natural gas feed stream at a natural gas storage facility, wherein the natural gas storage facility comprises at the same location an underground compressed gas storage reservoir and a liquefied natural gas (LNG) liquefier and storage unit; using an injection compressor system of the underground compressed gas storage reservoir to compress a first portion of the pipeline natural gas feed stream from a lower pressure to a natural gas injection pressure, and feeding the compressed first portion of the pipeline natural gas feed stream at the injection pressure into the underground compressed gas storage reservoir; using the injection gas compressor system to compress a second portion of the pipeline natural gas feed stream to a pressure above the lower pressure, and feeding the second portion of the pipeline natural gas feed stream at the pressure above the lower pressure into the LNG liquefier and storage unit to thereby produce LNG; feed the LNG into an LNG storage tank of the LNG liquefier and storage unit; and upon peak demand from a pipeline natural gas user: (a) withdrawing natural gas from the underground storage reservoir and re-injecting the withdrawn natural gas into the pipeline; and concurrently or sequentially (b) withdrawing, compressing, and vaporizing the stored LNG, and re-injecting the compressed and vaporized LNG into the pipeline. See FIG. 5, which depicts an exemplary flowchart of the method according to Aspect 43.

44. The method of aspect 43, wherein the storage reservoir is an underground formation for compressed natural gas storage.

45. The method of aspect 43, wherein the injection compressor system has a redundant injection compressor or a compressor having excess compression capacity.

46. The method of aspect 43, wherein the injection compressor system produces sequentially or concurrently the first and second compressed portions of the pipeline natural gas feed stream.

47. The method of aspect 43, wherein the lower pressure of the pipeline natural gas feed stream is between about 450 psia and about 650 psia, and wherein an outlet pressure of the compressor system is above the lower pressure and higher than about 660 psia.

48. The method of aspect 43, wherein the LNG liquefier unit is configured to produce nominally 100,000 gallons LNG/day.

49. The method of aspect 43, wherein the LNG storage unit comprises an LNG storage tank.

50. The method of aspect 43, further comprising a step of withdrawing at least a portion of the LNG for shipment as an LNG product.

51. The method of aspect 43, further comprising a step of dehydrating the withdrawn natural gas from the underground storage reservoir prior to feeding the withdrawn compressed natural gas to the pipeline.

52. The method of aspect 43, wherein the LNG liquefier and storage unit and the underground storage facility are configured to allow concurrent filling operation and concurrent or independent send-out operation.

53. The method of aspect 43, wherein the LNG liquefier and storage unit liquefies at least some of the second portion of the compressed pipeline natural gas feed stream via recuperative heat exchange and pressure reduction to so form the LNG and a vapor portion.

54. The method of aspect 53, wherein the vapor portion is recompressed and recycled into a suction side of the injection compressor system for reliquefaction, re-injection into the pipeline, or injection into the underground storage reservoir.

55. The method of aspect 43, wherein the steps of (a) withdrawing natural gas from the underground storage reservoir and re-injecting the withdrawn compressed natural gas into the pipeline and (b) withdrawing, compressing, and vaporizing the stored LNG, and re-injecting the compressed and vaporized LNG into the pipeline are performed concurrently.

56. The method of aspect 43, wherein the LNG liquefier and storage unit and the underground storage facility share a common operations center, a common security center, a common power supply system, and/or a common power backup system.

57. The method of aspect 43, wherein the LNG liquefier and storage unit and the underground storage reservoir are fluidly coupled to a common metering unit and/or a common measurement unit.

58. The method of aspect 43, wherein the underground storage reservoir and the LNG liquefier and storage unit are configured to share a power source, a power backup system, a metering sensor, a measuring sensor, and/or a control center.

In some embodiments, the numbers expressing quantities of ingredients, properties such as concentration, operating/process conditions, and so forth, used to describe and claim certain embodiments of the invention are to be understood as being modified in some instances by the term "about." As used herein, the terms "about" and "approximately", when referring to a specified, measurable value (such as a parameter, an amount, a temporal duration, and the like), is meant to encompass the specified value and variations of and from the specified value, such as variations of +/−10% or less, alternatively +/−5% or less, alternatively +/−1% or less, alternatively +/−0.1% or less of and from the specified value, insofar as such variations are appropriate to perform in the disclosed embodiments. Thus, the value to which the modifier "about" or "approximately" refers is itself also specifically disclosed. The recitation of ranges of values herein is merely intended to serve as a shorthand method of referring individually to each separate value falling within the range. Unless otherwise indicated herein, each individual value is incorporated into the specification as if it were individually recited herein.

It should be noted that any language directed to a computer or control system should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer-readable storage medium (e.g., hard drive, solid-state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet-switched network.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C, . . . and N, the text should be interpreted as requiring only one element from the group, not A plus N. or B plus N, etc.

What is claimed is:

1. A method of enhanced intermittent and on-demand natural gas storage for resilient supply of pipeline natural gas, comprising:

receiving from a pipeline a pipeline natural gas feed stream at a natural gas storage facility, wherein the natural gas storage facility comprises an underground compressed gas storage reservoir and a liquefied natural gas (LNG) liquefier;

using an injection compressor fluidly coupled to the underground compressed gas storage reservoir to compress a first portion of the pipeline natural gas feed stream from a lower pressure to a natural gas injection pressure, wherein the compressed first portion is then fed at the natural gas injection pressure into the underground compressed gas storage reservoir;

using the injection compressor to compress a second portion of the pipeline natural gas feed stream to a pressure above the lower pressure, and feeding the second portion of the pipeline natural gas feed stream at the pressure above the lower pressure into a liquefier of the LNG liquefier to thereby produce LNG;

feeding the LNG into an LNG storage tank of the LNG liquefier; and upon peak demand from a pipeline natural gas user:

(a) withdrawing natural gas from the underground compressed gas storage reservoir and re-injecting the withdrawn natural gas into the pipeline;

and concurrently or sequentially (b) withdrawing, compressing, and vaporizing the stored LNG from the LNG storage tank, and re-injecting the compressed and vaporized LNG into the pipeline.

2. The method of claim 1, wherein the injection compressor system has a redundant injection compressor or a compressor having excess compression capacity.

3. The method of claim 1, wherein the injection compressor system produces sequentially or concurrently the first and second compressed portions of the pipeline natural gas feed stream.

4. The method of claim 1, wherein the lower pressure of the pipeline natural gas feed stream is between about 450 psia and about 650 psia, and wherein an outlet pressure of the injection compressor system is above the lower pressure and higher than about 660 psia.

5. The method of claim 1, wherein the LNG liquefier unit is configured to produce nominally 100,000 gallons LNG/day.

6. The method of claim 1, further comprising a step of withdrawing at least a portion of the LNG for shipment as an LNG product.

7. The method of claim 1, further comprising a step of dehydrating the withdrawn natural gas from the underground storage reservoir prior to feeding the withdrawn compressed natural gas to the pipeline.

8. The method of claim 1, wherein the LNG liquefier and the underground storage facility are configured to allow concurrent filling operation and concurrent or independent send-out operation.

9. The method of claim 1, wherein the LNG liquefier liquefies at least some of the second portion of the compressed pipeline natural gas feed stream via recuperative heat exchange and pressure reduction to so form the LNG and a vapor portion.

10. The method of claim 9, wherein the vapor portion is recompressed and recycled into a suction side of the injection compressor system for reliquefaction, re-injection into the pipeline, or injection into the underground storage reservoir.

11. The method of claim 1, wherein the steps of (a) withdrawing natural gas from the underground storage reservoir and re-injecting the withdrawn compressed natural gas into the pipeline and (b) withdrawing, compressing, and vaporizing the stored LNG, and re-injecting the compressed and vaporized LNG into the pipeline are performed concurrently.

12. A method of enhanced intermittent and on-demand storage of pipeline natural gas, comprising:

receiving from a pipeline a pipeline natural gas feed stream at a natural gas storage facility wherein the natural gas storage facility comprises an underground compressed gas storage reservoir and a liquefied natural gas (LNG) production unit;

using an injection compressor to compress a first portion of the natural gas feed stream from a lower pressure to a natural gas injection pressure, and feeding the first portion of the natural gas at the natural gas injection pressure into the underground compressed gas storage reservoir;

using the injection gas compressor to compress a second portion of the natural gas feed stream to a pressure above the lower pressure or to the natural gas injection pressure, and feeding the second portion of the natural gas feed stream at the pressure above the lower pressure or at the natural gas injection pressure into the LNG production unit to thereby produce LNG;

feeding the LNG into an LNG storage tank; and (a) withdrawing natural gas from the underground compressed gas storage reservoir and feeding the withdrawn natural gas to the pipeline;

and concurrently or sequentially (b) vaporizing the LNG and feeding the vaporized LNG to the pipeline and/or the underground compressed gas storage reservoir.

13. The method of claim 12, wherein the injection compressor is a redundant injection compressor or a compressor having excess compression capacity, and/or wherein the injection compressor concurrently produces the first and second compressed portions of the natural gas feed stream.

14. The method of claim 12, wherein the lower pressure of the natural gas feed stream is between 450-800 psia, wherein the pressure above the lower pressure or the natural gas injection pressure is between 800 and 1,400 psia.

* * * * *